United States Patent
Cox et al.

(10) Patent No.: US 6,456,725 B1
(45) Date of Patent: Sep. 24, 2002

(54) METHOD FOR INCREASING THE FUNCTIONALITY OF A MEDIA PLAYER/ RECORDER DEVICE OR AN APPLICATION PROGRAM

(75) Inventors: Ingemar J. Cox, Lawrenceville; Matthew L. Miller, Princeton, both of NJ (US)

(73) Assignee: Signafy, Inc., Princeton, NJ (US)

( * ) Notice: Subject to any disclaimer, the term of this patent is extended or adjusted under 35 U.S.C. 154(b) by 0 days.

(21) Appl. No.: 09/339,541

(22) Filed: Jun. 24, 1999

(51) Int. Cl.⁷ ................................................. G06K 9/00
(52) U.S. Cl. ..................................................... 382/100
(58) Field of Search .......................... 434/118; 382/100, 382/232; 345/723; 707/4, 9, 102; 713/176, 200, 201; 348/460, 463; 725/32, 34, 35

(56) References Cited

U.S. PATENT DOCUMENTS

| | | | |
|---|---|---|---|
| 5,499,294 A | | 3/1996 | Friedman |
| 5,613,004 A | | 3/1997 | Cooperman et al. |
| 5,646,997 A | | 7/1997 | Barton |
| 5,761,686 A | | 6/1998 | Bloomberg |
| 5,841,886 A | | 11/1998 | Rhoads |
| 5,841,978 A | | 11/1998 | Rhoads |
| 5,862,217 A | | 1/1999 | Steinberg et al. |
| 5,862,218 A | | 1/1999 | Steinberg |
| 5,875,249 A | | 2/1999 | Mintzer et al. |
| 6,154,172 A | * | 11/2000 | Piccioneelli et al. ..... 342/357.1 |
| 6,263,438 B1 | * | 7/2001 | Walker et al. .............. 713/178 |
| 6,285,774 B1 | * | 9/2001 | Schumann et al. ......... 382/100 |
| 6,286,100 B1 | * | 9/2001 | Morimoto et al. .......... 713/176 |

OTHER PUBLICATIONS

Friedman, The Trustworthy Digital Camera, Restoring Credibility To The Photographic Image, IEEE Transactions on Consumer Electronics, vol. 39, No. 4, pp. 905–910, Nov. 1993.

Hsu, et al., Hidden Signatures In Images, Proceedings of the 1996 IEEE International Conference in Image Processing, ICIP '96, vol. 3, pp. 223–226, 1996.

Kundur, et al., Towards a Telltale Watermarking Technique for Tampering Proofing.

Lin, et al., An Image Authenticator Surviving DCT–Based Variable Quantization Table Compressions.

Lin, et al., A Watermark–Based Robust Image Authentication Method Using Wavelets, Advent Report, Columbia University, Apr. 1998.

Lin, et al., Generating Robust Digital Signature For Image/ Video Authentication, Multimedia and Security Workshop at ACM Multimedia '98, Bristol, U.K., Sep. 1998.

Lin, et al., A Robust Image Authentication Method Surviving LPEG Lossy Compression, SPIE Storage and Retrieval of Image/Video Databases, San Jose, CA, Jan. 1998.

(List continued on next page.)

Primary Examiner—Andrew W. Johns
Assistant Examiner—Seyed Azarian
(74) Attorney, Agent, or Firm—Scully, Scott, Murphy & Presser

(57) ABSTRACT

A method for utilizing a title signal contained in digital data through a comparison of the title signal to a player signal stored in a player device. The method includes the steps of: downloading the digital data having the title signal via an Internet connection; possibly transferring the downloaded digital data to the player device; detecting, at the player device, the title signal in the data: comparing the title signal to the player signal stored at the player device; and performing an action based upon the comparison. In a preferred implementation of the present invention, the player device is a personal computer and the digital data is either image, video, audio or multimedia data or is an application program for running on the personal computer. Preferably, the player device is a personal computer. In other embodiments the title signal is contained in or part of an application program or is contained in data to be input into the application program.

67 Claims, 3 Drawing Sheets

OTHER PUBLICATIONS

Matsui, et al., Video–Stenography: How To Secretly Embed a Signature in a Picture, IMA Intellectual Property Project Proceedings, vol. 1, Issue 1, pp. 187–206, Jan. 1994.

Schneider, et al., A Robust Content Based Digital Signature For Image Authentication, 3rd IEEE International Conference on Image Processing, vol. 3, pp. 227–230, 1996.

Schyndel, et al., A Digital Watermark, IEEE Conference Publication.

Wong, A Public Key Watermark For Image Verification and Authentication.

* cited by examiner

METHOD FOR INCREASING THE FUNCTIONALITY OF A MEDIA PLAYER/RECORDER DEVICE OR AN APPLICATION PROGRAM

BACKGROUND OF THE INVENTION

1. Field of the Invention

The present invention relates generally to a method for increasing the functionality of a media player/recorder device and, more particularly, to a method utilizing a title signal contained in digital data, encoded as a subsignal of a digital watermark signal contained in the digital data, or contained within or part of an application program.

2. Prior Art

There is considerable interest in applying watermarking as a complimentary technology to encryption for copy protection of content on DVD video discs. It is currently proposed to insert 4-bits of copy control information. The first 2-bits indicate the copy permission associated with the content, i.e., free-to-copy, copy-once, copy-no-more and never-copy. The other 2-bits are used to control the associated analog copy protection system that prevents VHS recording of copy-no-more and copy-never material. The watermark-is expected to code these 4-bits of information and 4 additional bits whose use is not yet defined.

In order-for the copy protection system to work, all DVD recorders- preferably all (digital) video recorders—must have watermark detector circuitry that detects a watermark in the video and prevents the compliant DVD player or recorder from performing an illegal action, e.g., recordings a copy-never movie. The cost of this detector may be small and is borne by the equipment manufacturers, despite the fact that there is no direct benefit to said manufacturers. In fact, adding copy generation control to DVD players and recorders not only costs manufacturers money but also reduces the functionality of the devices in the view of the consumer, i.e. consumers want to make copies of movies. Of course, both the equipment manufacturer and the consumer indirectly benefit, since without adequate copy protection technology, content owners would not publish their content on this media.

Nevertheless, consumers would like to copy pre-recorded content, and equipment manufacturers are therefore not inclined to install copy protection mechanisms in general and watermark detectors in particular. Thus, legislative and licensing mechanisms are being considered in order to compel the incorporation of copy-protection schemes. While such-measures are likely to be reasonably successful, it is nevertheless clear that equipment manufactures will only do the minimum necessary to meet their legal obligations.

Ideally, content owners would like to have a copy protection scheme that included increased functionality such that manufacturers and consumers would actually seek out such devices rather than non-compliant devices. Clearly, if a consumer is not permitted to make a copy of a movie, then some other functionality must be provided to compensate for this limitation.

Content owners of electronic books and software are faced with similar problems with regard to providing an incentive for consumers to purchase upgrades or new versions of their products.

SUMMARY OF THE INVENTION

Therefore it is an object of the present invention to provide a method in which a copy protection scheme adds increased functionality to a player and/or recorder device or to-an application program.

It is a further object of the present invention to provide a method in which a player and/or recorder device having a copy protection scheme is sought after by manufacturers and consumers of the device.

Accordingly, a method for-utilizing a "title signal" contained in multiple copies of a title is proposed. Here, title refers to the title of digital content data, for example a movie, such as "Waterworld", and the multiple copies refer to say, each copy of the movie that is replicated onto a DVD disk or downloaded to a personal computer via an Internet connection. When a copy of a title is played, the title signal is compared with a player signal previously stored in a player device. The data includes digital image, video (both of which are hereinafter referred to as image data), audio data, and multimedia data. The method comprises the steps of: downloading the digital data having the title signal via an Internet connection; transferring the downloaded digital data to the player device; detecting, at the player device, the title signal in the data: comparing the title signal to the player signal stored at the player device; and performing an action based upon the comparison.

In a preferred implementation, the action is performed if the title signal matches the player signal, and an action is to notify the device user of the match and the winning of a prize. Other actions are also possible, including allowing the user to view hidden video chapters of the movie or hidden audio tracks. Any action that a user perceives as valuable is a candidate action.

In another preferred implementation, the title signal is a subsignal of a watermark signal encoded in the digital data, in which case the method further comprises the steps of: extracting the watermark signal from the digital data; and decoding the subsignal.

In yet another preferred implementation, the title signal is a subsignal of the copy control watermark signal encoded in the digital data, in which case the method further comprises the steps of: extracting the watermark signal from the digital data; and decoding the subsignal. The benefit of this arrangement is that while the copy control watermark may inhibit illegal recording and playback, it also provides added functionality that outweighs its perceived disadvantage. Consequently, users will actively desire compliant-devices. Of course, the method described need not be technologically coupled to the copy control watermark, but instead, might be coupled by licensing means.

In another embodiment of the present invention, a method for utilizing a title signal contained in digital data through a comparison of the title signal to a player signal stored in, or available from, a personal computer is provided. The method comprises the steps of: providing the digital data having the title signal; detecting, at the personal computer, the title signal in the data: comparing the title signal to the player signal; and performing an action based upon the comparison.

In yet another embodiment of the present invention, the title signal is contained in or is part of a computer readable set of instructions (hereinafter alternatively referred to as a computer program which includes an application program or an operating system) running on a machine capable of reading the set of instructions (hereinafter alternatively referred to as a personal computer) where the computer readable set of instructions is accessed from a variety of possible sources including memory, hard disk, CD and/or DVD drives or the Internet.

When Internet distribution is used, it is relatively straightforward to encode different Title signals in different copies of the same title. This is in contrast to DVD disks, where the replication process makes this more difficult. Furthermore, different matching algorithms and/or actions can be download along with the video, thereby providing much greater flexibility than for stand-alone players and recorders.

Title numbers need not be restricted to image, audio or multimedia data when used in conjunction with a PC. In fact, for example, any application program can be assigned a title number. When the application program is run, the program compares its title number to a player number contained within or from information available at the P.C. and acts accordingly.

In still yet another embodiment of the present invention, the data for an application program can contain the title number which is compared to the player number. For example, a document might have a title number which is read by a word processing application.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

Figure 1:
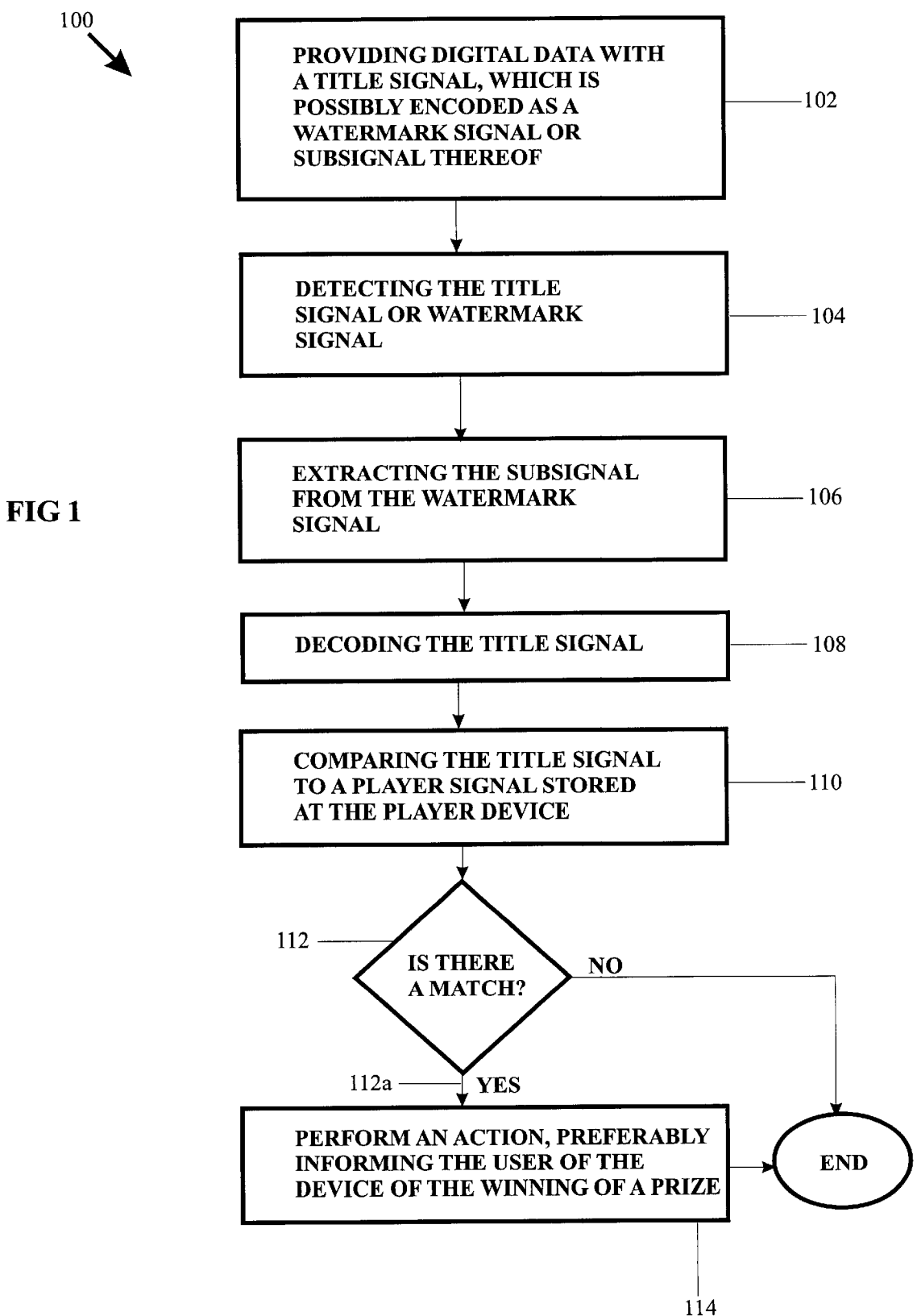
FIG. 1 illustrates a flow chart of a preferred implementation of the methods of the present invention.
Figure 2:
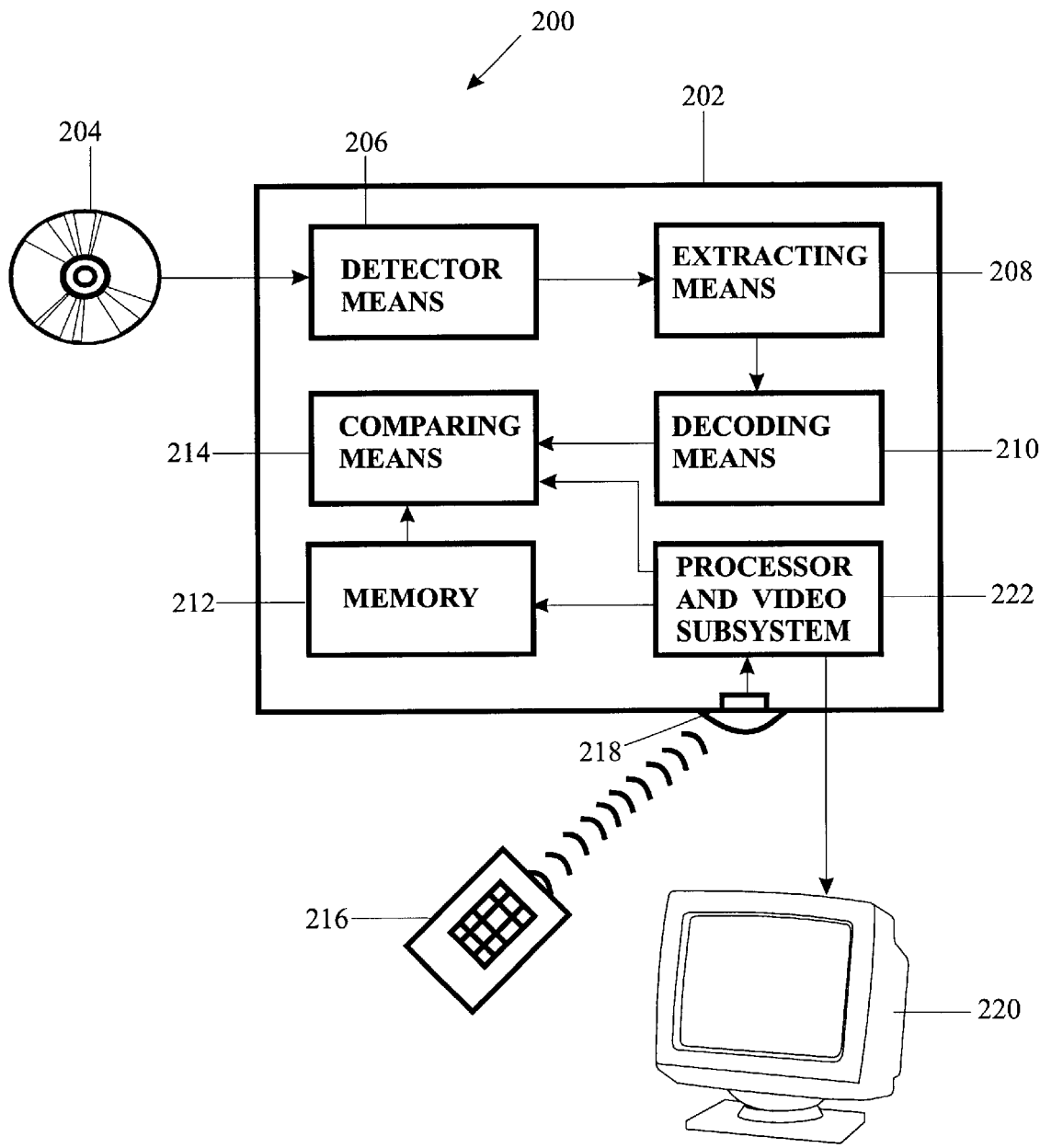
FIG. 2 illustrates a schematical view of a preferred implementation of a device of the present invention.

Referring now to FIGS. 1 and 2, there are illustrated a flow chart of the preferred implementation of a first embodiment of the methods of the present invention and a schematic illustration of a device for carrying out the methods of the present invention, respectively referred to by reference numerals 100 and 200. The method 100 and device 200 utilizes a title signal contained in data, preferably digital data, for increasing the functionality of a player and/or recorder device 202 (hereinafter referred to as a player), such as a DVD player which displays and/or records the digital data or a personal computer. However, the methods of the present invention can also be implemented in other devices, such as VHS players wherein the title signal is contained on the magnetic tape of the VHS cartridge.

The title signal is defined as any signal extracted from the digital data (or from an application program as discussed below) and ultimately compared to a player signal stored at the player device or computed from an attribute of the player device. Preferably, the title signal is the same for all copies of the digital data (e.g., all copies of "Waterworld" would contain the same title signal). However, the title signal can also vary from copy to copy of the digital data.

In a preferred implementation of the present invention, the title signal is preferably a subsignal of a watermark signal encoded in the digital data. The title signal and the subsignal of the watermark signal are hereinafter used interchangeably to refer to the title signal that is compared to player signal stored in the player 202. Preferably the watermark signal contains a copy protection subsignal of a predetermined number of bits, with the remaining bits being the subsignal which is detected and utilized by the method 100 of the present invention. Currently, the Data Hiding Sub Group of the Copy Protection Technical Working Group specifies an 8-bit watermark, of which 4-bits remain undefined. The additional, unspecified 4-bits of the envisioned watermarking method provides capabilities and increased functionality that both the manufacturer and consumer desire. Thus, the length of the copy protection signal is eight bits, four of which are utilized for copy protection information and one to four of the remaining bits are used to encode the title subsignal. A variety of encodings are possible, especially when these four bits can vary over time. Thus, many bits (easily 256) can be encoded in a time varying manner within the digital data content. In this manner, the title signal can consists of many bits, e.g. 256, while only requiring at least one bit to vary over time. It is therefore not necessary that all four undefined bits of the watermark be allocated for the purposes of this method. However, one (or more) bits is preferable.

Alternatively, the title signal might be encoded as part of the tag/ticket framework that has also been proposed to support copy generation management. The title signal might even be separate meta-data, though some of the advantage of coupling the title signal to the copy protection system may then be lost. However, this coupling might be accomplished by way of a licensing agreement.

The method 100 comprises a first step at 102 of providing the digital data having the title signal. Content owners would produce the digital data, preferably in the form of a DVD 204 containing digital video data such as a motion picture. However, it will be appreciated by those skilled in the art, that the means for providing the digital data having the title signal can be in any one of many forms and containing any one of possible content. A further variation on the method is to permit a title to have more than one title signal, i.e. some copies would contain one title signal, another set of copies would contain different title signal, etc. In the limit, each copy might contain a unique title signal. However, in-practice, this is unlikely, due to the nature of the replication process. However, such a possibility is realistic for some forms of Internet distribution. At step 104, the device 200 then detects the title signal in the digital data (or the subsignal contained in the watermark signal) by any detection means 206 known in the art.

If the title signal is in the form of a subsignal of a watermark encoded in the digital data, then the watermark must be extracted from the video data at step 106 and decoded at step 108. Any means for extracting a subsignal from a watermark signal 208 and decoding the subsignal 210 known in the art can be utilized for this purpose without departing from the scope or spirit of the present invention.

At this point in the method 100, the title signal is compared at step 110 to a player signal stored in a memory 212 at the player device by any comparison means 214 known in the art. As will be discussed below, it is the preferred implementation of the method to have the player signal be indicative of an attribute of the device, device user, digital data, or digital data owner.

Those skilled in the art will appreciate that the methods and apparatus of the present invention are independent of the copy protection mechanisms that will eventually be adopted by industry. Only steps 102, 104, and 110–114 are essential to practicing the method of the present invention, the remaining steps merely being a preferred implementation of the present invention for use with the copy protection mechanism.

A novel feature of the present invention is that an N-bit signal (referred to as the title signal), be associated with the digital data, e.g., digital video. This may be done in a variety of different ways. For example, the title signal may be inserted as part of a watermark as discussed above.

If the digital data content is a movie, the title signal is preferably identical for all copies of the movie. However, this is not essential, but is most likely, due to the nature of the DVD replication process. When a DVD video movie 204 is played in a DVD player 202, the title signal is detected by hardware (i.e., detecting means 206) in the player 202. This title signal is then compared with the player signal that is preferably unique to each DVD player and which is stored in the memory 212 of the player 202. In its simplest form, the player signal would be an N-bit random number. However, in more sophisticated embodiments of the method, the N-bit player signal might contain fields that identify the manufacturer of the player 200, the model number, serial number as well as programmable fields that contain information relating to the owner's name, address and other personal detail which the user can input into the player 202.

The means for inputting such information can be a remote control device 216 remotely linked to the player 202 via a receiver 218 which inputs the information into the memory 212 through the intermediary of a processor 222 for converting the remote control signals into the player signal recognized by the comparing means 214. The user can alternatively view the inputted data on a monitor 220 while it is being entered. Further fields might contain information on the current time and date. Clearly, other information is also possible without departing from the scope or spirit of the present invention.

At step 112 it is determined whether there is a match of the title signal and the player signal. The matching of the title signal and player signal may be a direct bit comparison or a more flexible regular expression match of characters within corresponding fields of the two numbers, i.e. a perfect match would not be necessary, but approximate matches would also be possible.

When the player 202 determines that its player signal matches the title signal, shown schematically as step 112a, it can inform the user of the match at step 114. A variety of different mechanisms can be used to do this. For example, a overlay screen might appear on the user's TV monitor 220 connected to the player 202, informing the user of the match. Alternatively, the player 202 might jump to a chapter of the video, which might otherwise be hidden from view, which would inform the viewer of the match. Numerous other mechanisms are also possible without departing from the scope or spirit of the present invention.

Thus, the player 202 of the present invention can invoke an action based upon a comparison of information (i.e., the title signal) contained in the digital data content (i.e., movie) and in the player. One possible way to create functionality that is desirable to the consumer is through the use of prize marketing. In the simplest implementation, the player signal would be random and the title signal would match some (approximately) known number of players 202. The movie, or digital content in general, could then be marketed with the opportunity to win, for instance, a cash prize, if the title signal contained in the digital data matched the player's player signal.

The viewer might also be instructed to telephone a coordination center to verify the match. The center would not need to know the title signal for the movie, only the set of possible matching player signals. For security reasons, the viewer might only be informed of an encrypted version of the player signal which could be decrypted at the coordination center. In this manner, the same player signal could not be used again and the encryption prevents users from guessing other numbers that might also match.

Many other forms of prizes are, of course, possible, including dinner with the stars of the movie. In fact, the methods of the present invention offer a new variety of "product placement" for studios, since the prize does not actually have to be provided by the studio but might come from a co-marketing company such as MacDonalds. Such an arrangement possibly offers the content owners, such as a movie studio, an additional revenue stream through selling the title signal. Thus, there is a clear financial benefit to the content owners.

The manufacturers of the players, such as DVD equipment, also gain advantages from the methods of the present invention. First, the consumer sees a further distinction between DVD video players and conventional VHS players. In particular, this product differentiation is complimentary to the higher quality of the DVD video over VHS video, which may not be sufficient to persuade users to switch to DVD.

A second-advantage is that, if the player signal contains manufacturer information such as make and model, the equipment manufacturers can sell demographic information about the purchasers of their equipment to the (prize) marketers who can in turn choose a title signal that is not random but actually targets a particular demographic group. Thus, there is also a possible financial benefit to equipment providers.

Furthermore, in order for equipment manufacturers to participate in these promotions, content owners could require that the manufacturers enter into a licensing arrangement that guarantees a high level of copy protection.

Figure 3:
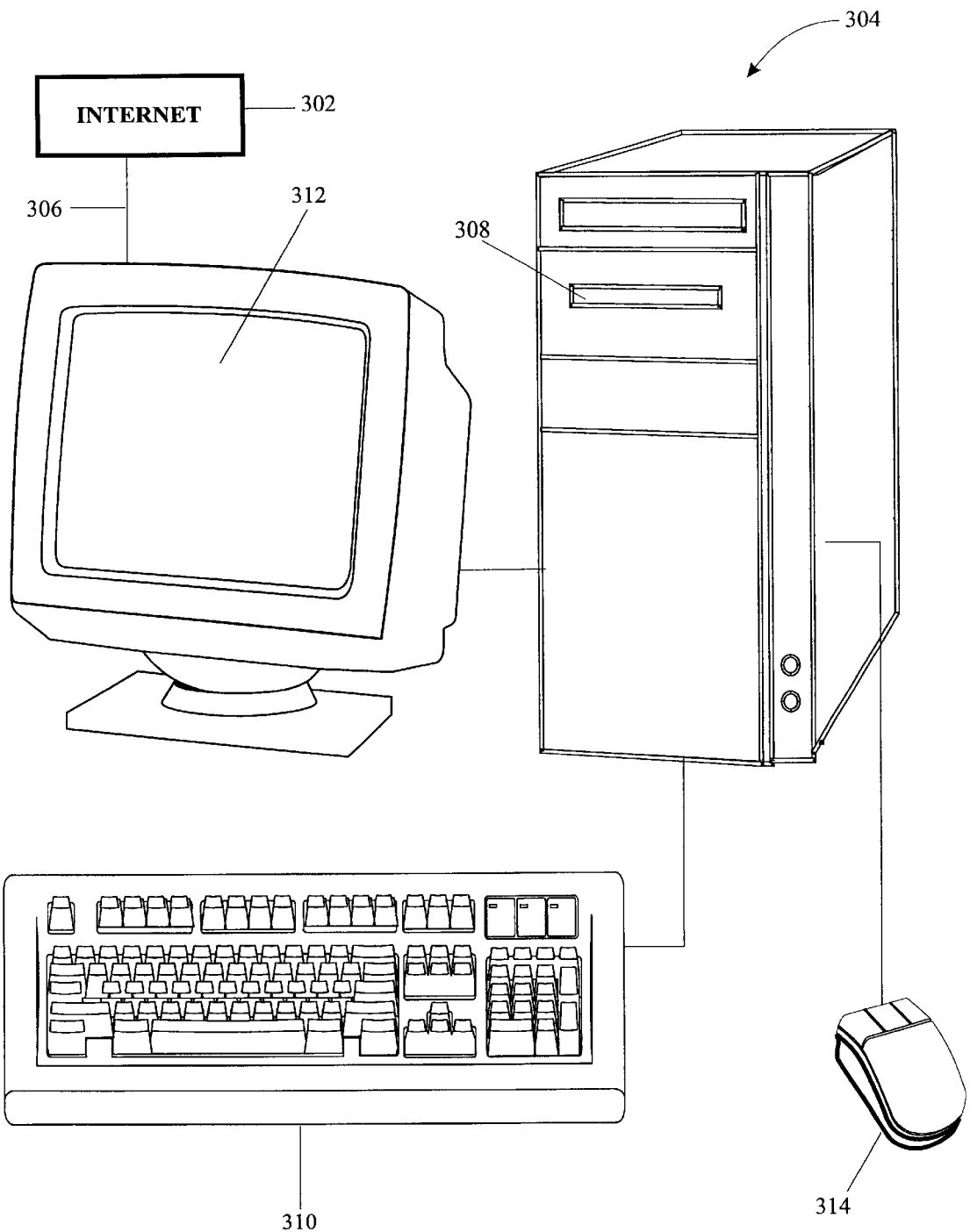
FIG. 3 illustrates a variation of the present invention wherein the digital data having the title signal is downloaded to a personal computer.

Referring now to FIG. 3 a variation of the methods of the present invention previously discussed will now be described. As discussed above, the digital data and the corresponding title signal are distributed on media such as a DVD disc 204. However, it is apparent that the Internet (shown schematically as 302) allows the digital data to be downloaded from the Internet 302, as for example, in the case of streaming audio. In such cases, the title signal may be received by a set-top box that converts the digital data into a traditional format, e.g. NTSC video for display on a TV. Other possibilities include downloading the digital data into a specialized player such as is done with MP3 audio and the Diamond Rio MP3 player. Alternatively, the digital data may be stored and/or played directly on the P.C.

Copy protection is less well defined within the context of the Internet. However, it is expected that similar or identical solutions will eventually be adopted. Moreover, as has been previously stated, the application of this invention is not tied to copy control and can be performed independent of it.

In another embodiment of the present invention, the title signal can be contained in or a part of an application program which runs on a P.C. 304. The player signal may be stored within the application program or the P.C. 304 or it may be computed from information available in the PC. 304. For example, the player signal might be a function of the Ethernet address of the computer or use the recent ID information that is unique to each Pentium chip (or other processor) or might be acquired when the user registers the program with the manufacturer. Combinations of these approaches are also possible. Similarly to the embodiments discussed above, the application program can be downloaded to the P.C. 304 via the Internet. Also, like the player device discussed above, the player signal can be input into the P.C. via an input device (such as a keyboard 310 or a mouse 314) and viewed on a monitor 312.

The present invention up until now has focused on digital data in the form of photographs, audio, video, and multimedia signals. However, within the context of a computer environment, there is little distinction between these forms of data and other data, e.g. documents, or even programs. Everything is stored as bits. It is therefore reasonable to consider assigning title signals to these other data and programs as well. For example, an application program could have a title signal embedded within it and periodically compare this number to the player number which, as stated earlier would be a possibly unique identifier of the PC. Once again, if the title and player numbers matched, then an action would be performed such as notifying the user that a prize had been won. Each different application program may look at different information available at the P.C. for its player signal. For instance, a word processing application may look to the Pentium chip I.D. for the player signal which it will use to compare to the title signal contained within (or a part of) the word processing application program. However, another application program, such as a spreadsheet, may look to the system clock for its player signal. That is, the application program preferably has within it a subset of instructions directing it to look for and compute the player signal. However, the operating system for the P.C., such as a Windows operating system, when it launches an application program, can read a title signal from the application program, and compare the title signal to a player signal that the operating system computes. However, more flexibilty exists if these actions are performed by the application program rather than the operating system.

Preferably, the comparing, matching, and informing steps outlined above are also controlled by the application program. However, the operating system can also perform all or any one of these steps.

In the case where the title signal is contained in or appended to an application program and the player recorder is a personal computer 304 running the application program, verification of a match between the title signal and player signal will, in many cases, happen automatically, as the application program can communicate with a third party management center over the Internet 302, thereby eliminating or reducing the need for a customer to contact the third party by telephone. However, in cases where the PC does not have an active Internet connection 306, personal phone communication to the third party-can still be used.

In the situation where the player device is a personal computer 304, or a component thereof 308 (e.g., a DVD player or a CD-RW) or even a stand-alone player device 200, the downloaded digital data may be completely or partially written to a writeable medium or storage device within the personal computer before the title signal contained therein is compared to the player signal. The downloaded data is then transferred to the player device or component thereof, or stand-alone device at which the title signal is compared to the player signal. The digital data may also be used in real time as it downloads from the Internet. However, this is also defined as a transfer of the digital data, since it must be transferred from the Ethernet card, or similar device, to the player device.

In the case where the title signal is contained in or appended to an application program running on a personal computer 304, the player signal can be determined by the application program which either at start-up, periodically, or intermittently, would compare the title-and player numbers. As stated earlier, the player number can be a function of a variety of sources including the system clock, Ethernet address, Pentium chip ID, registration number. and personal information, e.g. name, address, etc, present on the computer. Alternatively, or in conjunction with this, the application program might communicate with a remote site to obtain a player number. Again, the remote site might generate this number is a variety of ways, including sending a purely random number in the case of a lottery arrangement.

Players that are connected to a network also allow other forms of communication between the player and third parties. Consequently, it is possible to upgrade the player automatically, as is currently done with many application programs, by downloading updates from Internet sites. Amongst other things, these upgrades may include changes to the player signal or to the method of computing the player signal or the algorithms used to perform the matching of the title and player signals to enhance performance. Moreover, users might be encouraged to upgrade their players if the upgrade is promoted by (temporarily) increasing the frequency of matching for upgraded players over earlier versions or even making the earlier versions obsolete such that they would not match new title signals. This provides a strong motivation to upgrade, even if such an upgrade is not free.

In yet another embodiment of the present invention, the title signal can be contained in digital data that is used to input into an application program running on a P.C. For instance, a text document which is read and displayed, and maybe even capable of being edited, by a word processing application program can have the title signal contained therein. The text document can be an electronic version of a book which contains the title signal. When the electronic book is input into the word processing program and opened, the application program (or alternatively the operating system) will detect the title number and perform the comparing and matching steps. Of course, the document for use with the application program can also be downloaded via the Internet.

In yet still another embodiment of the present invention, the title signal in the digital data can be encrypted using a private key. When played in a player device, the player device would detect the title signal in the data and decrypt the encrypted title signal using the player signal as the private key. Next a determination would be made regarding whether the result of the decryption results in the title signal, that is, whether the particular player signal in the player device was in fact the private key used to encrypt the title signal. If the decryption does result in the title signal, like the previously discussed methods, an action is performed such as informing the user of the winning of a prize. Any or all of the variations on this theme discussed above can also be implemented.

It will be appreciated by those skilled in the art that although some of the methods and apparatus of the present invention have been discussed with regard to application programs and personal computers, it is clear that any computer readable set of instructions and any machine capable of reading and executing those instructions are within the scope and spirit of the present invention.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for utilizing a title signal contained in digital data through a comparison of the title signal to a player signal stored in a player device, the method comprising the steps of:
   downloading the digital data having the title signal via an Internet connection;
   transferring the downloaded digital data to the player device;
   detecting, at the player device, the title signal in the data:
   comparing the title signal to the player signal; and
   performing an action based upon the comparison.

2. The method of claim 1, wherein the digital data is streaming audio or video data.

3. The method of claim 1, wherein the player signal is indicative of an attribute of the device, device user, data, or data owner.

4. The method of claim 1, wherein the title signal is a watermark signal, or a subsignal thereof, encoded in the digital data, wherein the method further comprises the steps of:
   extracting the, watermark signal from the digital data; and
   decoding the watermark signal or subsignal thereof.

5. The method of claim 4, wherein the watermark signal contains a copy protection subsignal of a predetermined number of bits, the title signal being a portion of the predetermined number of bits unused by the copy protection subsignal.

6. The method of claim 5, wherein the copy protection signal is eight bits, four of which are utilized for copy protection information and a subset of the four remaining bits are used to encode the title signal.

7. The method of claim 6, wherein all four remaining bits are used to encode the title signal.

8. The method of claim 1, wherein the action is performed if the title signal matches the player signal.

9. The method of claim 8, wherein the action is to inform the device user of the match and at least one consequence thereof.

10. The method of claim 9, wherein the consequence is informing the user of the winning of a prize.

11. The method of claim 9, wherein the digital data is digital video data and the consequence is allowing a hidden video chapter to be viewed.

12. The method of claim 9, wherein the digital data is digital audio data and the consequence is allowing a hidden audio track to be heard.

13. The method of claim 9, wherein the action is to inform the device user of the match and of the player signal, or an encrypted version thereof.

14. The method of claim 13, further comprising the step of confirming, at a third party, that the title signal matches the player signal for preventing fraudulent claims.

15. The method of claim 14, wherein the confirming step is done via the Internet connection.

16. The method of claim 3, wherein the player signal is indicative of the device user's name, device user's address, device user's social security number, device's serial number, manufacturer's id, and or device's model number.

17. The method of claim 1, further comprising the step of encoding the title signal in a time varying manner.

18. The method of claim 3, further comprising the step of inputting the player signal to the player device prior to the comparing step.

19. The method of claim 8, wherein perfect matching between the title signal and player signal is necessary in order to perform the action.

20. The method of claim 8, wherein imperfect or approximate matching between the title signal and player signal is permitted in order to perform the action.

21. The method of claim 8, wherein the title signal and player signal contain at least two fields, each field comprising a group of bits, wherein matching of fields between the title signal and player signal is permitted in order to perform the action.

22. The method of claim 1, wherein at least one title signal which when compared to the player signal evokes the performance of the action, is sold to a co-marketing company.

23. The method of claim 1, wherein at least one title signal which when compared to the player signal evokes the performance of the action, is chosen to match at least one targeted demographic group.

24. The method of claim 23, wherein demographic information relating to the targeted demographic group is sold to advertisers.

25. The method of claim 1, wherein the action is performed if the title signal matches the player signal and the action is to inform the device user of the match and contact information for communicating with a third party in order to determine a prize.

26. The method of claim 25, wherein the third party requests and collects additional information to determine the prize.

27. The method of claim 1, wherein the player device is a personal computer and the transferring step comprises storing the downloaded data to a recordable medium readable by the player device.

28. The method of claim 27, wherein the detecting, comparing and performing steps are performed after the storing step is completed.

29. The method of claim 27, wherein the detecting, comparing and performing steps are performed after the downloaded digital data is partially stored such that the title signal is available for use in the method before the storing step is completed.

30. The method of claim 1, wherein the player device is a personal computer and at least the detecting step is performed in real time as the digital data is downloaded.

31. A method for utilizing a title signal contained in digital data through a comparison of the title signal to a player signal stored in, or available from, a personal computer, the method comprising the steps of:
   providing the digital data having the title signal;
   detecting, at the personal computer, the title signal in the data:
   comparing the title signal to the player signal; and
   performing an action based upon the comparison.

32. The method of claim 31, wherein the action is performed if the title signal matches the player signal.

33. The method of claim 32, wherein the action is to inform the personal computer user of the match and at least one consequence thereof.

34. The method of claim 33, wherein the consequence is informing the user of the winning of a prize.

35. The method of claim 33, wherein the action is to inform the personal computer user of the match and of the player signal, or an encrypted version thereof.

36. The method of claim 33, further comprising the step of confirming, at a third party, that the title signal matches the player signal for preventing fraudulent claims.

37. The method of claim 36, wherein the confirming step is done via the Internet connection.

38. A method for utilizing a title signal contained in a computer readable set of instructions through a comparison of the title signal to a player signal stored in, or available from, a personal computer, the method comprising the steps of:

providing the computer readable set of instructions having the title signal;

detecting the title signal in the computer readable set of instructions:

comparing the title signal to the player signal; and performing an action based upon the comparison.

39. The method of claim 38, wherein the action is performed if the title signal matches the player signal.

40. The method of claim 39, wherein the action is to inform the personal computer user of the match and at least one consequence thereof.

41. The method of claim 40, wherein the consequence is informing the user of the winning of a prize.

42. The method of claim 40, wherein the action is to inform the personal computer user of the match and of the player signal, or an encrypted version thereof.

43. The method of claim 42, further comprising the step of confirming, at a third party, that the title signal matches the player signal for preventing fraudulent claims.

44. The method of claim 42, wherein the confirming step is done through the personal computer via an Internet connection.

45. The method of claim 42, wherein the computer readable set of instructions having the title signal contained therein is provided to the personal computer by downloading via an Internet connection.

46. The method of claim 31, wherein the player signal is embedded within the computer readable set of instructions.

47. The method of claim 31, wherein the detecting step comprises computing the player signal from the information available from the personal computer.

48. The method of claim 47, wherein the information available from the personal computer is selected from a group consisting of, a processor identification number, a system clock time and/or date, an Ethernet address, a registration number, and personal information about a registered user of the personal computer.

49. The method of claim 31, wherein the comparing step is performed by a subset of instructions contained within the computer readable set of instructions.

50. The method of claim 31, wherein the computer readable set of instructions represents an application program executable by the personal computer, wherein the personal computer has an operating system for launching the application, and wherein the detecting step is performed by the operating system.

51. The method of claim 50, wherein the operating system also performs the comparing and/or performing steps.

52. The method of claim 50, wherein the operating system passes the title and/or player signal to the application for performance of the comparing and/or performing steps.

53. The method of claim 31, further comprising the step of expiring the player signal after a predetermined time such that it is no longer useful for comparison to the title signal.

54. The method of claim 53, further comprising the step of updating the player signal by purchasing a new player signal for comparison to the title signal.

55. The method of claim 54, wherein the new player signal is purchased as part of an upgrade for the computer readable set of instructions.

56. A method for utilizing a title signal contained in digital .data to be input into a computer readable set of instructions through a comparison of the title signal to a player signal stored in, or available from, a personal computer, the method comprising the steps of:

providing the digital data having the title signal;

inputting the digital data to the computer readable set of instructions;

detecting the title signal in the digital data:

comparing the title signal to the player signal; and performing an action based upon the comparison.

57. The method of claim 56, wherein the action is performed if the title signal matches the player signal.

58. The method of claim 57, wherein the action is to inform the personal computer user of the match and at least one consequence thereof.

59. The method of claim 58, wherein the consequence is informing the user of the winning of a prize.

60. The method of claim 56, wherein the action is to inform the personal computer user of the match and of the player signal, or an encrypted version thereof.

61. The method of claim 56, further comprising the step of confirming, at a third party, that the title signal matches the player signal for preventing fraudulent claims.

62. The method of claim 61, wherein the confirming step is done through the personal computer via an Internet connection.

63. The method of claim 56, wherein the computer readable set of instructions is a word processing application program and the digital data is a document read thereby.

64. A method for utilizing a title signal contained in digital data and a player signal stored in a player device, the method comprising the steps of:

encrypting the title signal using a private key;

detecting, at the player device, the title signal in the data;

decrypting the encrypted title signal using the player signal as the private key;

determining if the result of the decryption step results in the title signal; and performing an action based upon the determination.

65. The method of claim 64, wherein the action is performed if the result of the decryption results in the title signal.

66. The method of claim 65, wherein the action is to inform the device user of the determination and at least one consequence thereof.

67. The method of claim 66, wherein the consequence is informing the user of the winning of a prize.

* * * * *